June 16, 1931.  J. ARNOLD  1,810,002

FILM MARKING DEVICE

Filed March 11, 1930

Inventor
John Arnold
By Lyon & Lyon
Attorneys

Patented June 16, 1931

1,810,002

UNITED STATES PATENT OFFICE

JOHN ARNOLD, OF LOS ANGELES, CALIFORNIA, ASSIGNOR TO METRO-GOLDWYN-MAYER CORPORATION, OF CULVER CITY, CALIFORNIA, A CORPORATION OF NEW YORK

FILM MARKING DEVICE

Application filed March 11, 1930. Serial No. 434,916.

This invention relates to a device for placing identifying marks on films while said films are in a camera, and preferably during exposure of said films.

The invention more particularly relates to an extremely simple device adapted to be made part of any commercial type of cinematographic camera without encumbering the same or in any way interfering with its normal operation, said device being capable of effectively marking or light-spotting the film, preferably at or near its edge, for the purpose of indicating the beginning or termination of any particular scene, or indicating that portion of a scene at which it will become desirable, subsequently, to cut the film and insert or join on another or different view.

Numerous attempts have been made prior to this invention to accomplish the same result, namely, placing identifying marks upon continuous motion picture film, but such prior devices have either been entirely too cumbersome to place upon a camera, or impaired the picture area of the film, thereby destroying some of the scenes recorded.

The device embraced by this invention is free from all of the disadvantages of prior devices.

An object of this invention is to disclose and provide an arrangement of elements whereby continuous films may be readily marked in cinematographic cameras.

Another object is to disclose and provide a device which may be readily attached to cinematographic cameras for purposes of marking continuous films therein.

Another object is to disclose and provide means for forming identifying marks on continuous films during exposure thereof in a cinematographic camera.

Other objects, uses and advantages of this invention will become apparent from the following detailed description which will be directed toward an embodiment of the invention as disclosed in the appended drawings, in which.

Figure 1:
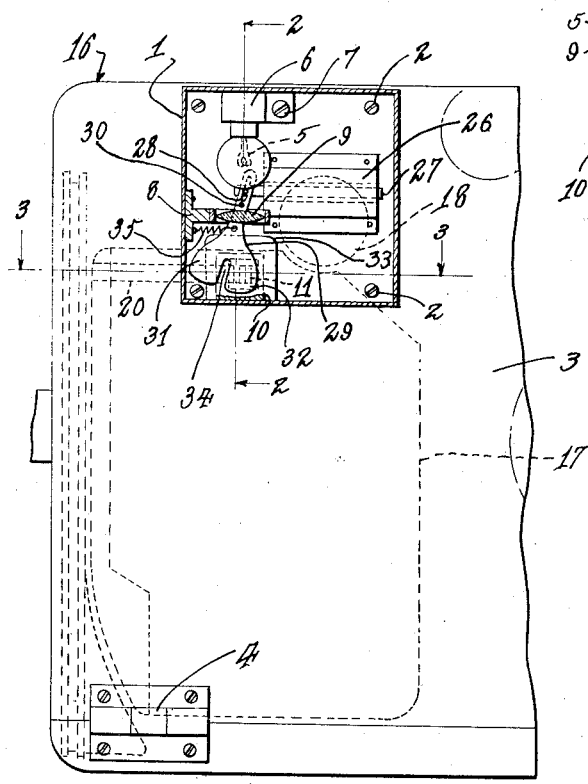
Fig. 1 is a side elevation of a portion of a camera, the said view including a section through a portion of the device embraced by this invention.
Figure 2:
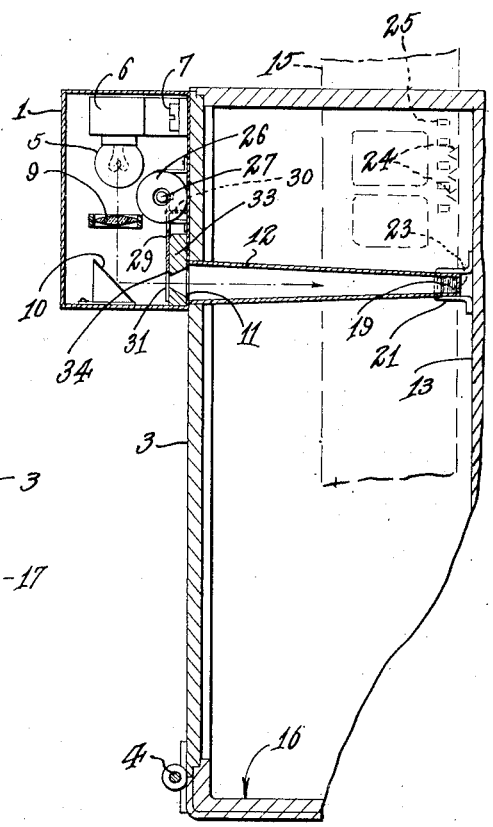
Fig. 2 is a transverse section, taken generally along the plane 2—2 indicated in Fig. 1.

As shown in the drawings, the device may comprise a suitable housing 1 connected in any suitable manner, as for example by means of screws 2, to the outer surface of a door 3 of a motion picture camera. The door 3 may be hinged at 4 and be provided with suitable locking devices, not shown. The housing 1 may include a suitable light source, such as for example, a filament 5 adjustably held within a base 6 connected to said housing as by means of a screw 7.

A suitable lens support 8 may be attached to the side of the housing 1, said lens support being provided with a converging lens 9 adapted to converge light from the lamp 5 onto a reflecting surface, such as a mirror 10 connected to the bottom of the housing 1, said mirror 10 being adapted to reflect light from the lamp 5 through a suitable aperture 11 in the wall of the housing 1 and in the door 3.

A light passage 12 may lead from the opening 11 to the interior wall 13 of the camera, or to such a point as to permit a right angle bend 14 to be made in the light passage 12 and direct light onto that portion of the film 15 at which it is desired to mark the film.

It is to be understood that the camera, generally indicated at 16, includes a suitable movement housing 17, sprockets and rollers such as the roller 18 adapted to guide the film into the movement and in alinement with the aperture. Preferably, the housing 1 of the device is so placed on the door 3 of the camera 16 as to permit the light passage 12 and the portion 14 to extend above the movement housing 17.

A small reflecting mirror or other reflecting surface, such as a polished piece of metal 19 is positioned at the termination of the light passage 12 or in the angle made between the light passage 12 and the portion 14 thereof, so as to direct light from the aperture 11 longitudinally of the passage portion 14 and the light passage 20.

Figure 3:
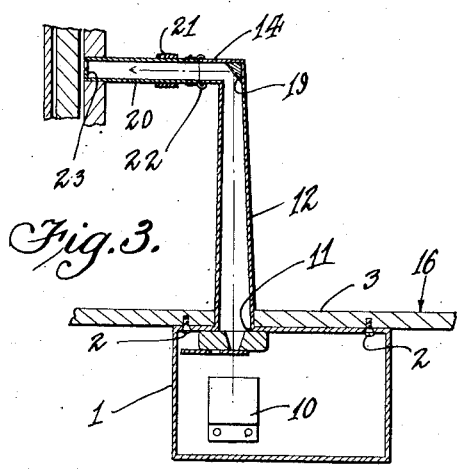
Fig. 3 is a horizontal section of the device, said view taken along the plane indicated at 3—3 in Fig. 1.

Preferably, the light passage 20 is rigidly held in position as by means of hanger straps 21 connected to the interior wall 13 of the camera, whereas the light passage 12 and the portion 14 thereof are rigidly connected to the housing 1 and to the movable door 3 of the camera. A suitable light valve or light-tight joint is made between the portion 14 and the stationary tube 20, as shown in Fig. 3, said joint comprising flexible means 22 connected to the stationary portion 20 on the bottom and side portions thereof and a similar flexible lapping means carried on the top of the movable portion 14. Said means 22 are adapted to slidably receive the light passage portion 14 and to close the joint between said portion and the tube 20.

The end of the passage 20 should be in close proximity to the film 15 and be provided with a suitable mask 23 of any desired formation. As shown in the drawings, the mask 23 is provided with a triangular opening adapted to permit the formation of triangular marks 24 on the edge of the film and substantially beyond the perforations 25 at the edge of the film 15. It is to be understood that instead of a triangular opening, the mask 23 may be formed with any other suitably shaped opening.

The housing 1 may be provided with an electromagnet or solenoid adapted to actuate a shutter. As shown in the drawings, the housing 1 may include a solenoid 26 provided with a movable core member 27, said movable core member being provided with a pin slidably engaged in a slot 28 of a shutter 29 pivotally connected to the housing 1 at 30. Any suitable form of shutter may be employed, but as shown in the drawing, said shutter may be provided with a bifurcated end, the portions 31 and 32 being adapted to close an opening in a face plate 33 positioned in front of the opening 11 communicating with the light passage 12. The opening 34 between said portions 31 and 32 is adapted to permit light to pass from said mirror 10 into said passageway 12 when said shutter is actuated.

The opening 34 between the shutter portions 31 and 32 is preferably similar to the opening in the face plate 33, so as to permit opening of the aperture for a substantially instantaneous admission of light into the passageway 12. A spring 35 may be provided for returning the shutter to its original position and for normally maintaining it in closed position.

Figure 4:
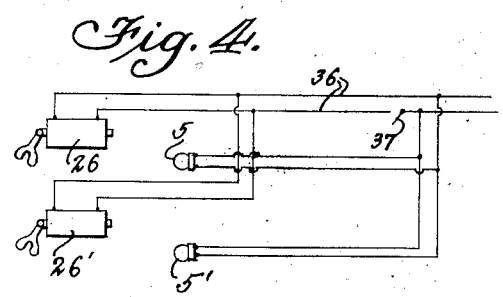
Fig. 4 is a wiring diagram, diagrammatically illustrating the device and means for its operation and control.

As shown in Fig. 4, the solenoid coil 26 may be supplied with electrical energy from any suitable source, as by lines 36, a switch 37 being provided in the line for energizing the coil 26. As shown in Fig. 4, two of such coils 26 and 26' are shown connected to the same source of electrical energy, thereby permitting two cameras, for example, to be simultaneously marked by the operation of the single switch 37. Such an arrangement is of particular advantage when two cameras are employed in taking a single scene, one of said cameras, for example, taking a close-up of the action, whereas the other takes a longer shot. The switch 37 may then be controlled by the director or any other person in charge of the photography, and when both cameras are in operation such director may, by closing the switch 37 for but a fraction of a second, cause a mark to be made in the edge of both films being exposed in the two cameras, thus indicating the precise moment at which he will later request that the cutters cut from one strip of film into the other. As shown in Fig. 4, the sources of illumination, namely, the lamps 5 and 5', are directly connected to the source of electrical energy and are thus maintained constantly in action.

Although a particular form of device has been specifically described hereinabove, it is to be understood that numerous changes and modifications may be made, all such changes and modifications as come within the scope of the following claims being, therefore, embraced thereby.

I claim:

1. A film marking device comprising, in combination with a motion picture camera, a housing, a source of light within the housing, an opening from said housing into said camera, a shutter operably positioned with respect to said opening within the housing, electromagnetic means operably connected to said shutter, a light passage leading off from said opening into said camera and into operative relation with film in such camera, and means for selectively energizing the electromagnetic means to operate the shutter.

2. A film marking device comprising, in combination with a motion picture camera, a housing, a source of light within the housing, an opening from said housing into said camera, a shutter operably positioned with respect to said opening within the housing, electromagnetic means operably connected to said shutter, a light passage leading off from said opening into said camera and into operative relation with film in such camera, means for directing light from said light source into said passage, and means for selectively energizing the electromagnetic means to operate the shutter.

3. A film marking device comprising, in combination with a motion picture camera, a housing, a source of light within the housing, an opening from said housing into said camera, a shutter operably positioned with respect to said opening within the housing, electromagnetic means operably connected to said shutter, a light passage leading off from said opening into said camera and into operative relation with film in such camera, means for directing light from said light source into said passage through said opening, light reflecting means positioned in said passage adapted to direct light from said opening onto film in said camera, and means for selectively energizing the electromagnetic means to operate the shutter.

4. A film marking device comprising, in combination with a motion picture camera, a housing, a source of light within the housing, an opening from said housing into said camera, a shutter operably positioned with respect to said opening within the housing, electromagnetic means operably connected to said shutter, a light passage leading off from said opening into said camera and into operative relation with film in such camera, means for directing light from said light source into said passage through said opening, light reflecting means positioned in said passage adapted to direct light from said opening onto film in said camera, means for normally maintaining said shutter in closed position, and means for selectively energizing the electromagnetic means to open the shutter.

5. A film marking device comprising, in combination with a motion picture camera provided with a door, a housing connected to said door but exteriorly thereof, a source of light within the housing, an opening from said housing into said camera, a shutter operably positioned with regard to said opening within the housing, electromagnetic means operably connected to said shutter, an L-shaped light passage connected to said door and communicating with said opening, and leading into said camera, a stationary light passage within said camera adapted to extend said L-shaped passage into operative relation with film in said camera, substantially light tight means for joining said stationary and L-shaped light passages, light reflecting means positioned in the angle of said L-shaped passage for directing light from said source into said stationary passage and onto the film, and means for selectively energizing the electromagnetic means to operate the shutter.

Signed at Culver City, Calif., this 5th day of March, 1930.

JOHN ARNOLD.